(12) United States Patent
Juveneton

(10) Patent No.: US 10,740,335 B1
(45) Date of Patent: Aug. 11, 2020

(54) BIOMETRIC DATA COMBINATION ENGINE

(71) Applicant: Accenture Global Solutions Limited, Dublin (IE)

(72) Inventor: Florian Juveneton, Lyons (FR)

(73) Assignee: Accenture Global Solutions Limited, Dublin (IE)

(*) Notice: Subject to any disclaimer, the term of this patent is extended or adjusted under 35 U.S.C. 154(b) by 879 days.

(21) Appl. No.: 15/407,447

(22) Filed: Jan. 17, 2017

Related U.S. Application Data

(60) Provisional application No. 62/279,088, filed on Jan. 15, 2016.

(51) Int. Cl.
| | | |
|---|---|---|
| *G06F 16/24* | (2019.01) | |
| *G06F 16/2455* | (2019.01) | |
| *G06F 7/02* | (2006.01) | |
| *G06F 16/23* | (2019.01) | |
| *G06K 9/00* | (2006.01) | |

(52) U.S. Cl.
CPC ......... *G06F 16/2455* (2019.01); *G06F 7/02* (2013.01); *G06F 16/2379* (2019.01); *G06K 9/00926* (2013.01); *G06K 2009/00953* (2013.01)

(58) Field of Classification Search
CPC ..... G06F 16/2455; G06F 16/2379; G06F 7/02
See application file for complete search history.

(56) References Cited

U.S. PATENT DOCUMENTS

| | | |
|---|---|---|
| 6,047,281 A | 4/2000 | Wilson et al. |
| 6,993,659 B2 | 1/2006 | Milgramm et al. |
| 7,451,925 B2 | 11/2008 | Bonalle et al. |
| 7,542,590 B1 | 6/2009 | Robinson et al. |
| 7,596,246 B2 * | 9/2009 | Miller, Jr. .......... G06K 9/00885 340/5.82 |
| 7,885,432 B2 | 2/2011 | Tsubata |
| 8,218,828 B2 | 7/2012 | Lasso |
| 8,799,666 B2 | 8/2014 | Kesanupalli et al. |
| 9,165,216 B2 | 10/2015 | Angell et al. |
| 9,208,391 B2 | 12/2015 | Aoki |
| 9,280,715 B2 | 3/2016 | Stephan son |
| 9,426,150 B2 | 8/2016 | Stern et al. |
| 2015/0349959 A1 * | 12/2015 | Marciniak ............. H04L 9/3231 713/186 |
| 2016/0048670 A1 * | 2/2016 | Kim ..................... G06K 9/0008 382/117 |

* cited by examiner

*Primary Examiner* — Loc Tran

(74) *Attorney, Agent, or Firm* — Fish & Richardson, P.C.

(57) ABSTRACT

Methods, systems, and apparatus, including computer programs encoded on a computer storage medium, for combining biometric data are disclosed. In one aspect, a method includes the actions of accessing one or more synthetic biometric data samples. The actions further include identifying data that indicates characteristics of each of the one or more biometric data samples and data that indicates a quality score of each of the one or more biometric data samples. The actions further include identifying target parameters of a synthetic biometric database. The actions further include comparing the target parameters of the synthetic biometric database to the characteristics of each of the one or more biometric data samples and to the quality score of each of the one or more biometric data samples. The actions further include selecting, for the synthetic biometric database, a subset of the synthetic biometric data samples.

16 Claims, 3 Drawing Sheets

BIOMETRIC DATA COMBINATION ENGINE

CROSS-REFERENCE TO RELATED APPLICATION

This application claims the benefit of U.S. Provisional Application No. 62/279,088, filed Jan. 15, 2016, the contents of which are incorporated by reference.

TECHNICAL FIELD

This application generally relates to biometric data.

BACKGROUND

A biometric identifier is a distinctive, measurable characteristic of an individual. Instead of authenticating a user with a password, a system may use a biometric identifier.

SUMMARY

Protecting biometric data samples is of the utmost importance. Similar to passwords, an individual may use biometric data to authenticate the individual to gain access to a computing system or a physical space. However, biometric data may include sensitive medical information that is related to the individual who provided the biometric sample. For example, a scan of the iris or retina may reveal an eye condition. Because of this additional medically related information, improving the security and privacy surrounding biometric data may be helpful. At the same time, to properly test and debug some biometric systems, a biometric system may require access to an accurate database of biometric samples. Access to a database of real biometric samples presents too great of a security and privacy risk for the individuals who provided the samples and to the entity that relies on the samples for user authentication. Instead, a system may generate a synthetic biometric database that accurately reflects the characteristics and quality of a real biometric database. The system under test can then access the synthetic biometric database, thus preserving the security and privacy of the real biometric database.

To generate a synthetic biometric database, a system identifies the parameters of a real biometric database. The parameters may include statistical distributions related to the quality of the real biometric samples and statistical distributions related to the characteristics of the real biometric samples. The system accesses synthetic biometric samples that are not related to a particular individual. The system analyzes each of the synthetic biometric samples and determines a corresponding quality score and characteristics. The system selects the synthetic biometric samples according to quality and characteristics to generate a synthetic biometric database that has similar parameters to the real biometric database.

An innovative aspect of the subject matter described in this specification may be implemented in a method that includes the actions of accessing one or more synthetic biometric data samples; identifying data that indicates characteristics of each of the one or more biometric data samples and data that indicates a quality score of each of the one or more biometric data samples; identifying target parameters of a synthetic biometric database; comparing the target parameters of the synthetic biometric database to the characteristics of each of the one or more biometric data samples and to the quality score of each of the one or more biometric data samples; and based on comparing the target parameters of the synthetic biometric database to the characteristics of each of the one or more biometric data samples and to the quality score of each of the one or more biometric data samples, selecting, for the synthetic biometric database, a subset of the synthetic biometric data samples.

These and other implementations can each optionally include one or more of the following features. The actions further include identifying updated target parameters of the synthetic biometric database; comparing the updated target parameters of the synthetic biometric database to the characteristics of each of the one or more biometric data samples and to the quality score of each of the one or more biometric data samples; and, based on comparing the updated target parameters of the synthetic biometric database to the characteristics of each of the one or more biometric data samples and to the quality score of each of the one or more biometric data samples, selecting, for the synthetic biometric database, an updated subset of the synthetic biometric data samples. The characteristics of each of the one or more biometric data samples include a category of each of the one or more biometric data samples; and a subtype of each category. The quality score of each of the one or more biometric data samples includes a score that indicates a level that a respective biometric data sample reflects a respective physiological characteristic.

The biometric data samples are fingerprint data, palm vein data, facial recognition data, DNA, palm print data, hand geometry data, iris recognition data, or retinal data. The target parameters of synthetic biometric database indicate a distribution of each characteristic and each quality score range of the selected subset of the synthetic biometric data samples. The action of identifying target parameters of synthetic biometric database includes analyzing a biometric database that includes actual biometric data samples; based on analyzing the biometric database that includes actual biometric data samples, determining characteristics of each of the actual biometric data samples and a quality score of each the actual biometric data samples; and based on determining the characteristics of each of the actual biometric data samples and a quality score of each the actual biometric data samples, determining target parameters of the synthetic biometric database. The actions further include performing a test using the subset of the synthetic biometric data samples, wherein performing the test on real biometric data samples is prohibited.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may maintain the privacy of individuals who correspond to the biometric samples. The system may improve security of the biometric samples by only allowing minimal access to the biometric samples for the purpose of user authentication. The system may encrypt the biometric samples that correspond to individuals and only decrypt a sample to authenticate a user. The system does not unencrypt the biometric samples that correspond to individuals for a purpose other than user authentication.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
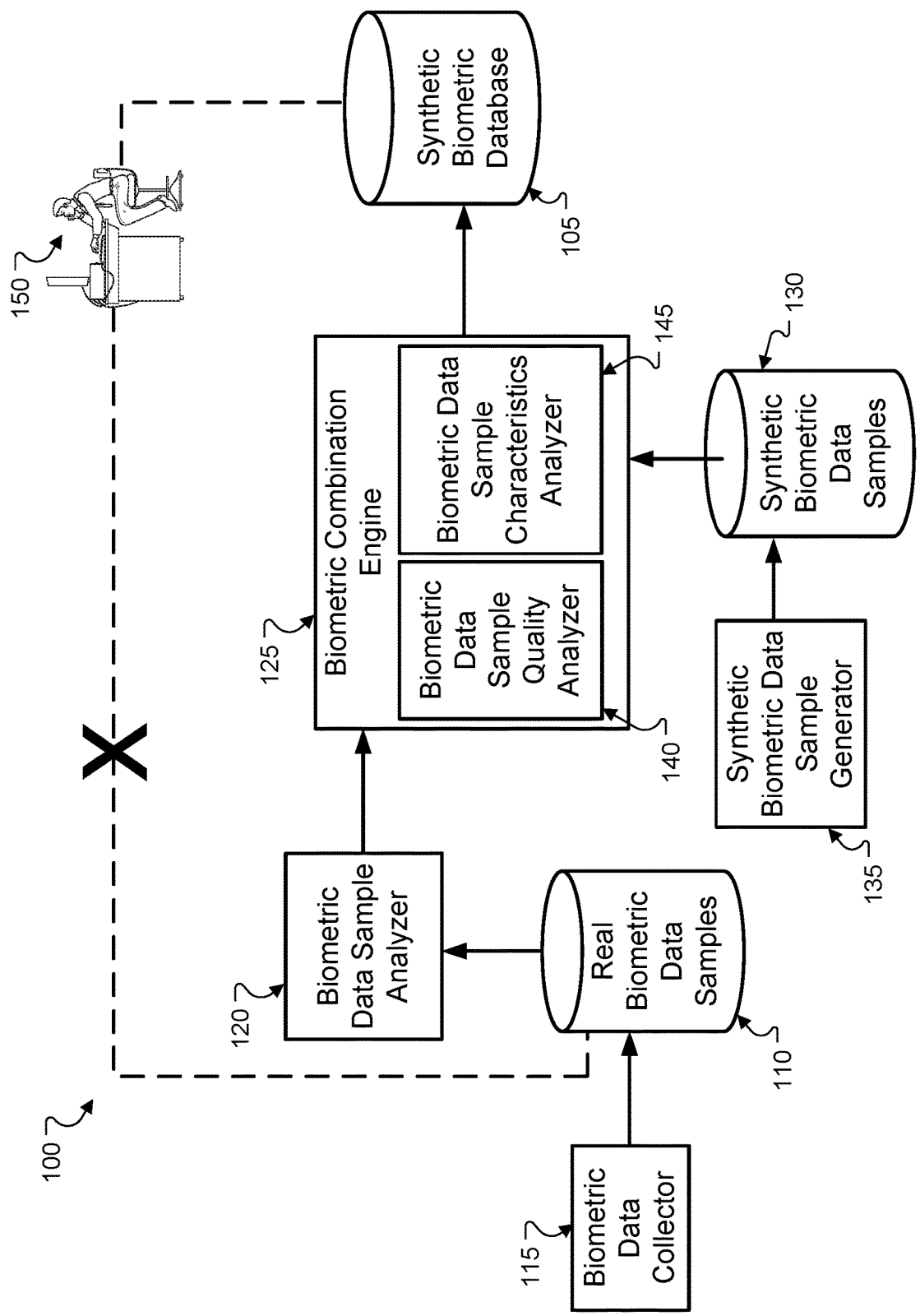
FIG. 1 illustrates an example system for generating a synthetic biometric database.

FIG. 1 illustrates an example system 100 for generating a synthetic biometric database 105. Briefly, and as described in further detail below, the system 100 analyses real biometric data samples 110 and generates a synthetic biometric database 105. The synthetic biometric database 105 has similar characteristics and quality to the real biometric data samples 110 while protecting the security and privacy of the individuals represented by the real biometric data samples 110.

In the example shown in FIG. 1, the biometric data collector 115 generates and collects biometric data samples. The biometric data collector 115 may be any device that is configured to collect biometric data. For example, the biometric data collector 115 may a device configured to detect physiological characteristics of an individual such as a fingerprint scanner, a retina scanner, a camera that executes facial recognition software, an iris scanner, a DNA reader, a palm scanner, or any other similar biometric data collector. Alternatively or additionally, the biometric data collector 115 may be a device to detect behavioral characteristics of an individual such as eye movement, typing rhythm analyzer, gait analyzer, voice analyzer, or any other similar biometric data collector.

The biometric data collector 115 may be owned and/or operated by an entity that uses biometric data to authenticate individuals. For example, the entity may be a government entity or a business entity. The entity may use the biometric data as a primary means of authentication for an individual or as a secondary means of authentication. For example, the entity may require an individual to enter a password and scan the individual's retina before authenticating the individual. Upon authentication, the entity may grant the individual access to a computing system and/or physical location.

The biometric data collector 115 may store the biometric data in the real biometric data samples 110. The real biometric data samples 110 may be owned and/or operated by a same entity that owns and/or operates the biometric data collector 115. During the authentication process, the entity compares biometric data received from an individual who is attempting to access a system or space to biometric data stored in the biometric data samples 110. Because the data stored biometric data samples 110 may be personal and sensitive to the individuals who supplied the biometric data, the biometric data samples 110 should be accessed only by authorized entities. The authorized entities may be the entity that collected the biometric data or the entity that is attempting to authenticate an individual.

The biometric data sample analyzer 120 is configured to analyze the quality and characteristics of the real biometric data samples 110. Although FIG. 1 only shows one biometric data collector 115, one real biometric data samples 110, and one biometric data sample analyzer 120, the system 100 may include one or more of each. Because of the security necessary to protect the real biometric data samples 110, each entity may operate a set of a biometric data collector 115, real biometric data samples 110, and a biometric data sample analyzer 120. Doing so may help prevent unauthorized access to the real biometric data samples 110.

The quality of a biometric data sample is related to how well it reflects the corresponding characteristic of the individual. For example, a fingerprint sample may have a low quality if the lines of the fingerprint image that represent the ridges of the finger are broken or if the image is blurry because the individual's finger was not still enough during the collection of the fingerprint. A fingerprint sample with a high quality may have crisp lines that represent the ridges of the finger. As another example, an iris scan with a higher quality may be more in focus than an iris scan with a lower quality. In some implementations, the quality of a biometric data sample may be a numerical quality score. For example, the scale may go from one to five with a lower number representing a lower quality.

To determine the quality of a biometric data sample, the biometric data sample analyzer 120 may compare the relative quality of the biometric samples of the real biometric data samples 110 to each other. The biometric data sample analyzer 120 may identify the biometric samples with higher levels of focus and clarity higher quality scores. Similarly, the biometric data sample analyzer 120 may identify the biometric samples with lower levels of focus and clarity lower quality scores. In some implementations, the biometric data sample analyzer 120 may determine a quality score without comparing the relative quality of the biometric samples. For example, if a biometric sample has a focus level within a particular range, then the biometric data sample analyzer 120 assigns a corresponding quality score. A focus level within a low range may correspond to a quality score of one. A focus level within a high range may correspond to a quality score of five.

The characteristics of a biometric data sample are related to a category and subtype that each sample relates to. The characteristics may be related to identifying features that are present in the biometric data samples. For example, a category of a fingerprint may be arches, loops, or whorls. Each of the categories refers to a pattern that is present in the fingerprint image. Each of these categories may include one or more subtypes. For example, the arches category may include plain arch, tented arch, radial arch, and ulnar arch. The loops category may include radial loop and ulnar loop. the whorls category may include plain whorl, central pocket whorl, double loop whorl, and accidental whorl. Each of these subtypes relates to an additional feature present in a corresponding fingerprint. These categories and subtypes may correspond to known features such that different entities may analyze the same fingerprint and categorize the fingerprint with the same category and subtype. Other examples of categories for a biometric sample such as an iris scan may include iris color and any sub-color. Similar to the fingerprints, each color category and sub-color subtype may correspond to a specific color range such that different biometric data sample analyzers may assign the same color and sub-color to the same iris scan.

The biometric data sample analyzer 120 generates statistical data that reflects the distribution of the quality scores and the distribution of the characteristics of the real biometric data samples. For example, the distribution of the quality scores may indicate that ten percent of the real biometric data samples have quality scores of one, twenty percent of the real biometric data samples have quality scores of two, forty percent of the real biometric data samples have quality scores of three, twenty percent of the real biometric data samples have quality scores of four, and ten percent of the real biometric data samples have quality scores of five. The distribution of categories may indicate that five percent are arches, sixty percent are loops, and thirty-five percent are whorls. Each category may also have a distribution of the subtypes. In some implementations, the distribution of the quality scores or categories may include ranges. For example, the distribution of categories may indicate that five percent are arches, sixty to seventy percent are loops, and twenty-five to thirty-five percent are whorls. In some implementations, the distribution of the quality scores or categories may correspond to particular physiological areas of a person's body. For example, with respect to fingerprints, each finger may have a different distribution of the quality scores and/or distribution of categories.

In some implementations, the biometric data sample analyzer 120 may group the real biometric data samples 110 into different groups before generating statistical data that reflects the distribution of the quality scores and the distribution of the characteristics of the real biometric data samples. For example, the biometric data sample analyzer 120 may group the individuals according to country of residence. The biometric data sample analyzer 120 may compute statistical data that reflects the distribution of the quality scores and the distribution of the characteristics for each of the countries.

The biometric data sample analyzer 120 provides the distribution of the quality scores and the distribution of the characteristics of the real biometric data samples to the biometric combination engine 125. The biometric combination engine 125 generates a synthetic biometric database 105 from the synthetic biometric data samples 130. The synthetic biometric data sample generator 135 generates synthetic biometric data sample that are similar to the real biometric data samples but do not correspond to a real individual. The synthetic biometric data sample generator 135 may generate any type of biometric data such as a synthetic fingerprint or a synthetic iris scan and store them in the synthetic biometric data samples 130.

Each of the synthetic biometric data samples has a quality and characteristics similar to the real biometric data samples. For example, a synthetic fingerprint may have a quality score of three and a category of whorl with a subtype of central pocket whorl. By having the same quality and characteristics to the real biometric data samples, the system 100 protects the privacy of the individuals of the real biometric data samples 110 while also preserving the security and integrity of the real biometric data samples 110, as access is not required to the real biometric data samples 110 for any testing purposes.

The biometric combination engine 125 includes a biometric data sample quality analyzer 140 and a biometric data sample characteristics analyzer 145. The biometric data sample quality analyzer 140 and the biometric data sample characteristics analyzer 145 may operate similarly to the biometric data sample analyzer 120. The biometric data sample quality analyzer 140 analyzes the quality of the synthetic biometric data samples 130 and calculates a quality score for each of the synthetic biometric data samples. The biometric data sample characteristics analyzer 145 analyses the synthetic biometric data samples and identifies categories and subtypes for each of the categories. For example, the biometric data sample quality analyzer 140 may analyze a synthetic fingerprint and calculate a quality score of four and determine that it belongs in the category arches with a subtype of plain arch.

In some implementations, the synthetic biometric data samples 130 may already include labels that include a quality score, category, and subtype. For example, the synthetic biometric data sample generator 135 may generate a synthetic iris scan that has a quality score of three, the category brown, and a subtype of hazel. The quality score, category, and subtype are included as labels in the synthetic biometric data samples 130. In this instance, the biometric combination engine 125 selects the synthetic biometric data samples by analyzing the labels of synthetic biometric data samples. In some implementations, the biometric data sample quality analyzer 140 and the biometric data sample characteristics analyzer 145 may confirm the quality score, category, and subtype labels.

The biometric combination engine 125 generates a synthetic biometric database 105 according to the quality score, category, and subtype distribution parameters provided by the biometric data sample analyzer 120. For example, the biometric combination engine 125 may receive distribution parameters for quality score, category, and subtype for each finger for residents of a particular country. The parameters may specify that the right thumbs have ten percent arches, fifty percent loops, and forty-five percent whorls. The arches include twenty percent plain arches, twenty percent tented arches, ten percent radial arches, and fifty percent ulnar arches. The parameters may include other distributions for the subtypes of the categories loops and whorls. The parameters may also specify that the right thumb has a quality score distribution of five percent with quality scores of one, thirty percent with quality scores of two, thirty percent with quality scores of three, thirty percent with quality scores of four, and five percent with quality scores of five.

The biometric combination engine 125 may generate multiple synthetic biometric databases. For example, one of the synthetic biometric databases may correspond to fingerprints for a particular country. Another synthetic biometric database may correspond to retina scans for another country. In some implementations, the biometric combination engine 125 may generate multiple synthetic biometric databases for one set of parameters. For example, the biometric combination engine 125 may receive parameters for retina scans for a particular continent. The biometric combination engine 125 may generate different synthetic retina scan databases that both match the received parameters.

The user 150 may analyze the synthetic biometric database 105 and perform tests on the synthetic biometric database 105. By performing tests on the synthetic biometric database 105, the user 150 is able to test the accuracy and performance of any software or systems that access a biometric database when operating. The user 150 may be prohibited from accessing the real biometric data samples 110 for legal or regulatory reasons. The user 150 is able to test any software or systems that access a biometric database and the system 100 improves the security and privacy of the individuals who provided the real biometric data samples 110 by only allowing access for authorized purposes.

Figure 2:
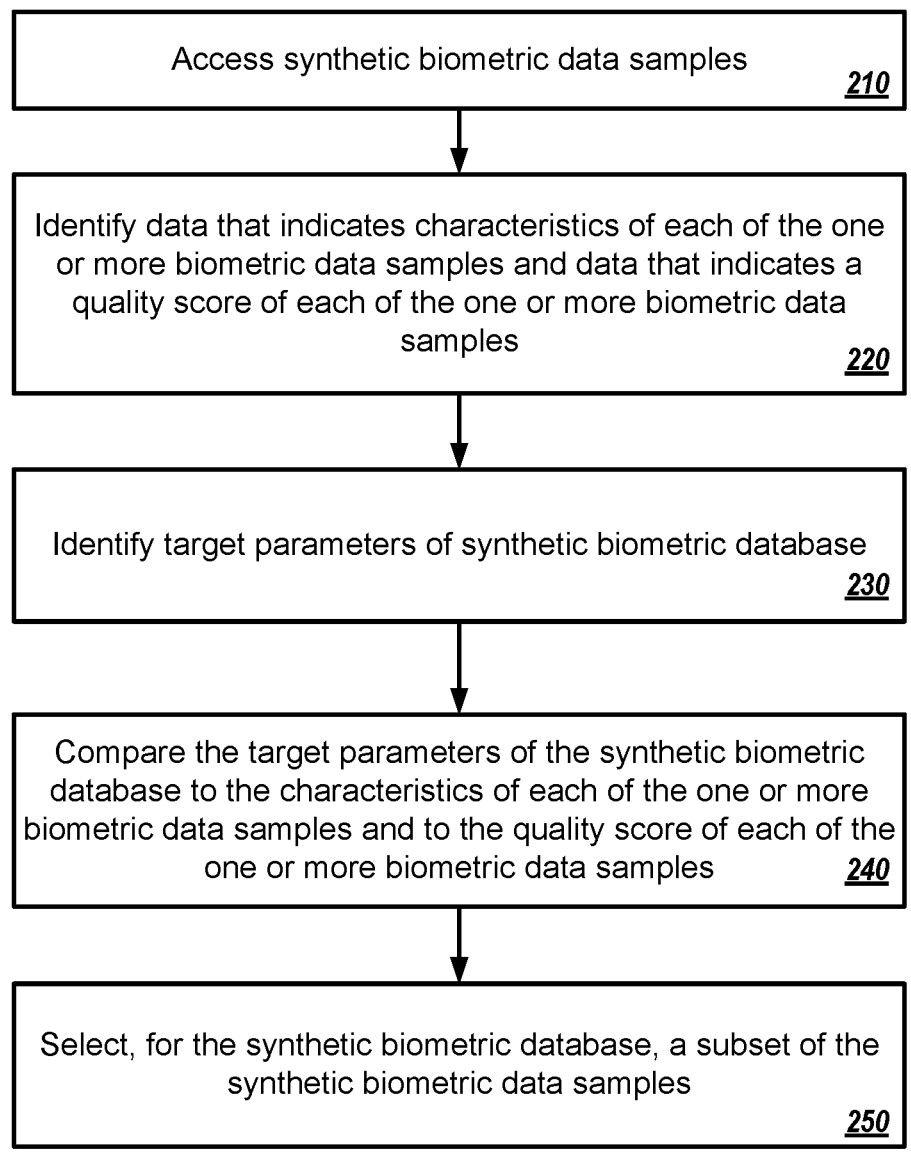
FIG. 2 illustrates an example process for generating a synthetic biometric database.

FIG. 2 illustrates an example process 200 for generating a synthetic biometric database. In general, the process 200 analyses real biometric data samples and generates a synthetic biometric database. The synthetic biometric database has similar characteristics and quality to the real biometric data samples while protecting the security and privacy of the individuals represented by the real biometric data samples. The process 200 will be described as being performed by a computer system comprising at one or more computers, for example, system 100 as shown in FIG. 1.

The system accesses one or more synthetic biometric data samples (210). In some implementations, the synthetic biometric data samples are fingerprint data, palm vein data, facial recognition data, DNA, palm print data, hand geometry data, iris recognition data, and/or retinal data. In some implementations, the synthetic biometric data samples are behavioral characteristics of an individual such as eye movement, typing rhythm analyzer, gait analyzer, voice analyzer, and/or any other similar biometric data collector. The synthetic biometric data samples are not related to a particular individual. Instead, the system generates the synthetic biometric data samples to have the appearance, characteristics, and quality of real biometric data samples.

The system identifies data that indicates characteristics of each of the one or more biometric data samples and data that indicates a quality score of each of the one or more biometric data samples (220). In some implementations, the characteristics of each of the one or more biometric data samples include a category of each of the one or more biometric data samples and a subtype of each category. For example, the characteristics of fingerprint data may be that the fingerprint pattern is an arch, loop, or whorl. The subtypes of the arch pattern characteristic may be plain arch, tented arch, radial arch, and ulnar arch. In some implementations, the quality score of the one or more biometric data samples is a score that indicates a level that a respective biometric data sample reflects a respective physiological characteristic. The quality score may be lower for biometric data samples that are out of focus or include lines that are broken as may be the case with fingerprints.

The system identifies target parameters of a synthetic biometric database (230). In some implementations, the system identifies target parameters of a synthetic biometric database by analyzing a biometric database that includes actual biometric data samples. The system determines, based on analyzing the biometric database that includes actual biometric data samples, characteristics of each of the actual biometric data samples and a quality score of each the actual biometric data samples. The system determines, based on determining the characteristics of each of the actual biometric data samples and a quality score of each the actual biometric data samples, target parameters of the synthetic biometric database. In some implementations, the system receives the target parameters from another system. In some implementations, the target parameters of synthetic biometric database indicate a distribution of each characteristic and each quality score range of the selected subset of the synthetic biometric data samples. For example, the target parameters may indicate that ten percent of the real biometric data samples have quality scores of one, twenty percent of the real biometric data samples have quality scores of two, forty percent of the real biometric data samples have quality scores of three, twenty percent of the real biometric data samples have quality scores of four, and ten percent of the real biometric data samples have quality scores of five. The target parameters may indicate that five percent are arches, sixty to seventy percent are loops, and twenty-five to thirty-five percent are whorls. The target parameters may include similar distributions for the subtypes of each category.

The system compares the target parameters of the synthetic biometric database to the characteristics of each of the one or more biometric data samples and to the quality score of each of the one or more biometric data samples (240). In some implementations, the system matches the target characteristics and target quality scores for the synthetic biometric database to synthetic biometric data samples that include the target characteristics and target quality scores.

The system, based on comparing the target parameters of the synthetic biometric database to the characteristics of each of the one or more biometric data samples and to the quality score of each of the one or more biometric data samples, selects, for the synthetic biometric database, a subset of the synthetic biometric data samples (250). In some implementations, the system identifies updated target parameters of the synthetic biometric database. The system compares the updated target parameters of the synthetic biometric database to the characteristics of each of the one or more biometric data samples and to the quality score of each of the one or more biometric data samples. The system selects, based on comparing the updated target parameters of the synthetic biometric database to the characteristics of each of the one or more biometric data samples and to the quality score of each of the one or more biometric data samples and for the synthetic biometric database, an updated subset of the synthetic biometric data samples. In this instance, the system is configured to update the synthetic biometric samples in the synthetic biometric database upon receiving updated parameters. This may be helpful if the biometric data of a population shifts, such as a shift in eye color to less blue eyes and more brown eyes. The system updates the synthetic biometric database to include more brown eye samples.

In some implementations, the system or a third party system may be unable to access the real biometric samples for testing of a device or software that relies on access to biometric samples that accurately reflect a population. To ensure that the system or a third party system is able to test the device or software, the system generates the synthetic biometric database with similar characterizes and quality as the real biometric sample database. With the synthetic biometric database, the privacy and security of the real biometric sample database is not compromised.

Figure 3:
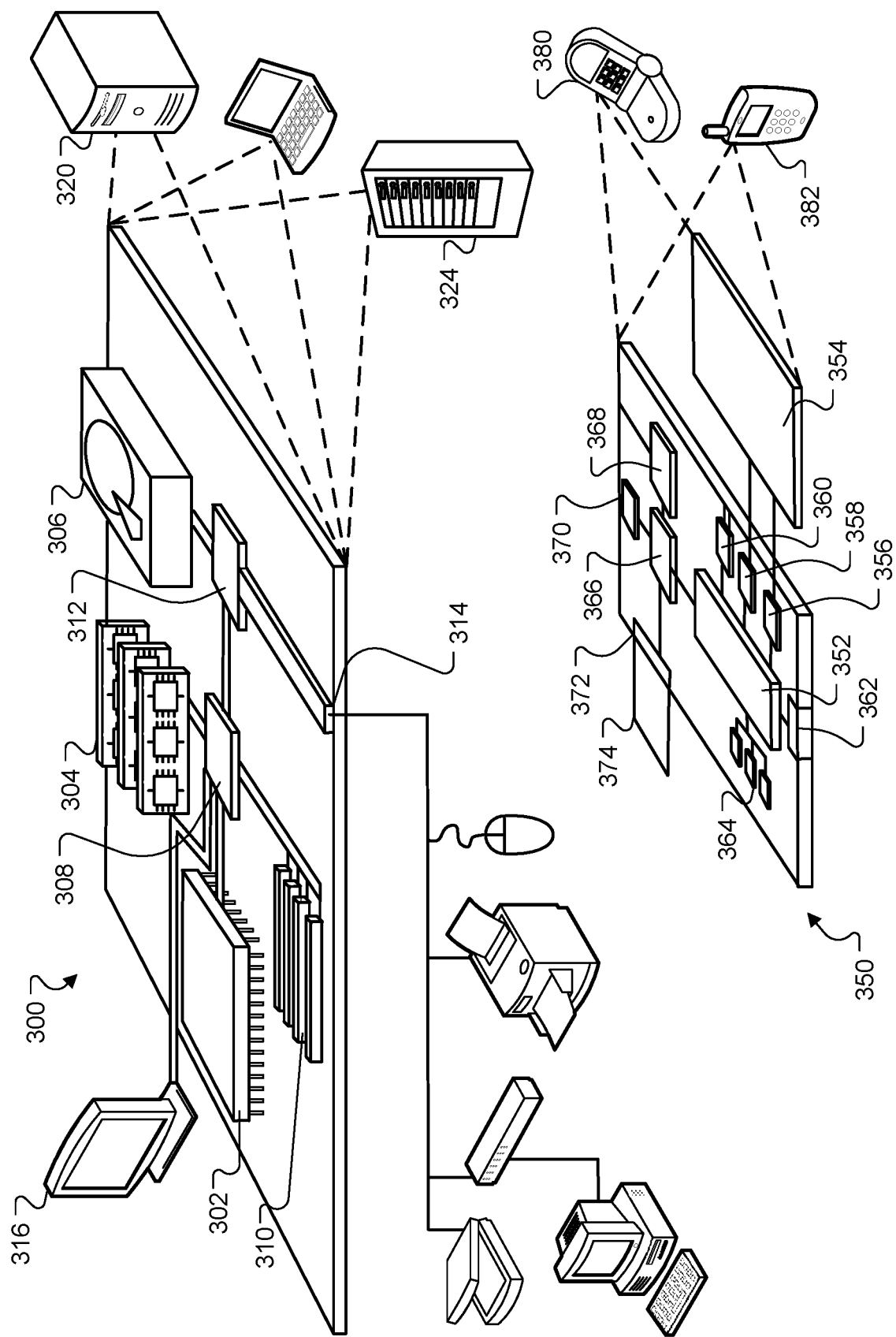
FIG. 3 illustrates an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
accessing one or more synthetic biometric data samples that were generated by a synthetic biometric data sample generator without a correspondence with a real individual;
identifying characteristics of each of the one or more synthetic biometric data samples and a quality score of each of the one or more synthetic biometric data samples, wherein the quality score of each of the one or more synthetic biometric data samples comprises a score that indicates a level that a respective synthetic biometric data sample reflects a respective physiological characteristic;
identifying target parameters of a synthetic biometric database, wherein the target parameters of the synthetic biometric database indicate a distribution of each characteristic and each quality score range of a subset of the synthetic biometric data samples;
performing a comparison of the target parameters of the synthetic biometric database to the characteristics of each of the one or more synthetic biometric data samples and to the quality score of each of the one or more synthetic biometric data samples;
based on the comparison, selecting the subset of the synthetic biometric data samples; and
storing the subset of the synthetic biometric data samples in the synthetic biometric database.

2. The method of claim 1, comprising:
identifying updated target parameters of the synthetic biometric database;
comparing the updated target parameters of the synthetic biometric database to the characteristics of each of the one or more synthetic biometric data samples and to the quality score of each of the one or more synthetic biometric data samples; and
based on comparing the updated target parameters of the synthetic biometric database to the characteristics of each of the one or more synthetic biometric data samples and to the quality score of each of the one or more synthetic biometric data samples, selecting, for the synthetic biometric database, an updated subset of the synthetic biometric data samples.

3. The method of claim 1, wherein the characteristics of each of the one or more synthetic biometric data samples comprise:
a category of each of the one or more synthetic biometric data samples; and
a subtype of each category.

4. The method of claim 1, wherein the synthetic biometric data samples are fingerprint data, palm vein data, facial recognition data, DNA, palm print data, hand geometry data, iris recognition data, or retinal data.

5. The method of claim 1, wherein identifying target parameters of synthetic biometric database comprises:
analyzing a biometric database that comprises actual biometric data samples;
based on analyzing the biometric database that comprises actual biometric data samples, determining characteristics of each of the actual biometric data samples and a quality score of each the actual biometric data samples; and
based on determining the characteristics of each of the actual biometric data samples and a quality score of each the actual biometric data samples, determining target parameters of the synthetic biometric database.

6. The method of claim 1, comprising:
performing a test using the subset of the synthetic biometric data samples, wherein performing the test on real biometric data samples is prohibited.

7. A system comprising:
one or more computers and one or more non-transitory storage devices storing instructions that are operable, when executed by the one or more computers, to cause the one or more computers to perform operations comprising:
accessing one or more synthetic biometric data samples that were generated by a synthetic biometric data sample generator without a correspondence with a real individual;
identifying characteristics of each of the one or more synthetic biometric data samples and a quality score of each of the one or more synthetic biometric data samples, wherein the quality score of each of the one or more synthetic biometric data samples comprises a score that indicates a level that a respective synthetic biometric data sample reflects a respective physiological characteristic;
identifying target parameters of a synthetic biometric database, wherein the target parameters of the synthetic biometric database indicate a distribution of each characteristic and each quality score range of a subset of the synthetic biometric data samples;
performing a comparison of the target parameters of the synthetic biometric database to the characteristics of each of the one or more synthetic biometric data samples and to the quality score of each of the one or more synthetic biometric data samples;
based on the comparison, selecting the subset of the synthetic biometric data samples; and
storing the subset of the synthetic biometric data samples in the synthetic biometric database.

8. The system of claim 7, wherein the operations further comprise:
identifying updated target parameters of the synthetic biometric database;
comparing the updated target parameters of the synthetic biometric database to the characteristics of each of the one or more synthetic biometric data samples and to the quality score of each of the one or more synthetic biometric data samples; and
based on comparing the updated target parameters of the synthetic biometric database to the characteristics of each of the one or more synthetic biometric data samples and to the quality score of each of the one or more synthetic biometric data samples, selecting, for the synthetic biometric database, an updated subset of the synthetic biometric data samples.

9. The system of claim 7, wherein the characteristics of each of the one or more synthetic biometric data samples comprise:
a category of each of the one or more synthetic biometric data samples; and
a subtype of each category.

10. The system of claim 7, wherein the synthetic biometric data samples are fingerprint data, palm vein data, facial recognition data, DNA, palm print data, hand geometry data, iris recognition data, or retinal data.

11. The system of claim 7, wherein identifying target parameters of synthetic biometric database comprises:
analyzing a biometric database that comprises actual biometric data samples;
based on analyzing the biometric database that comprises actual biometric data samples, determining characteristics of each of the actual biometric data samples and a quality score of each the actual biometric data samples; and
based on determining the characteristics of each of the actual biometric data samples and a quality score of each the actual biometric data samples, determining target parameters of the synthetic biometric database.

12. The system of claim 7, wherein the operations further comprise:
performing a test using the subset of the synthetic biometric data samples, wherein performing the test on real biometric data samples is prohibited.

13. A non-transitory computer-readable medium storing software comprising instructions executable by one or more computers which, upon such execution, cause the one or more computers to perform operations comprising:
accessing one or more synthetic biometric data samples that were generated by a synthetic biometric data sample generator without a correspondence with a real individual;
identifying characteristics of each of the one or more synthetic biometric data samples and a quality score of each of the one or more synthetic biometric data samples, wherein the quality score of each of the one or more synthetic biometric data samples comprises a score that indicates a level that a respective synthetic biometric data sample reflects a respective physiological characteristic;

identifying target parameters of a synthetic biometric database, wherein the target parameters of the synthetic biometric database indicate a distribution of each characteristic and each quality score range of a subset of the synthetic biometric data samples;

performing a comparison of the target parameters of the synthetic biometric database to the characteristics of each of the one or more synthetic biometric data samples and to the quality score of each of the one or more synthetic biometric data samples;

based on the comparison, selecting the subset of the synthetic biometric data samples; and storing the subset of the synthetic biometric data samples in the synthetic biometric database.

14. The non-transitory computer-readable medium of claim 13, wherein the operations further comprise:

identifying updated target parameters of the synthetic biometric database;

comparing the updated target parameters of the synthetic biometric database to the characteristics of each of the one or more synthetic biometric data samples and to the quality score of each of the one or more synthetic biometric data samples; and based on comparing the updated target parameters of the synthetic biometric database to the characteristics of each of the one or more synthetic biometric data samples and to the quality score of each of the one or more synthetic biometric data samples, selecting, for the synthetic biometric database, an updated subset of the synthetic biometric data samples.

15. The non-transitory computer-readable medium of claim 13, wherein identifying target parameters of synthetic biometric database comprises:

analyzing a biometric database that comprises actual biometric data samples;

based on analyzing the biometric database that comprises actual biometric data samples, determining characteristics of each of the actual biometric data samples and a quality score of each the actual biometric data samples; and based on determining the characteristics of each of the actual biometric data samples and a quality score of each the actual biometric data samples, determining target parameters of the synthetic biometric database.

16. The non-transitory computer-readable medium of claim 13, wherein the operations further comprise:

performing a test using the subset of the synthetic biometric data samples, wherein performing the test on real biometric data samples is prohibited.

* * * * *